United States Patent Office 3,143,859
Patented Aug. 11, 1964

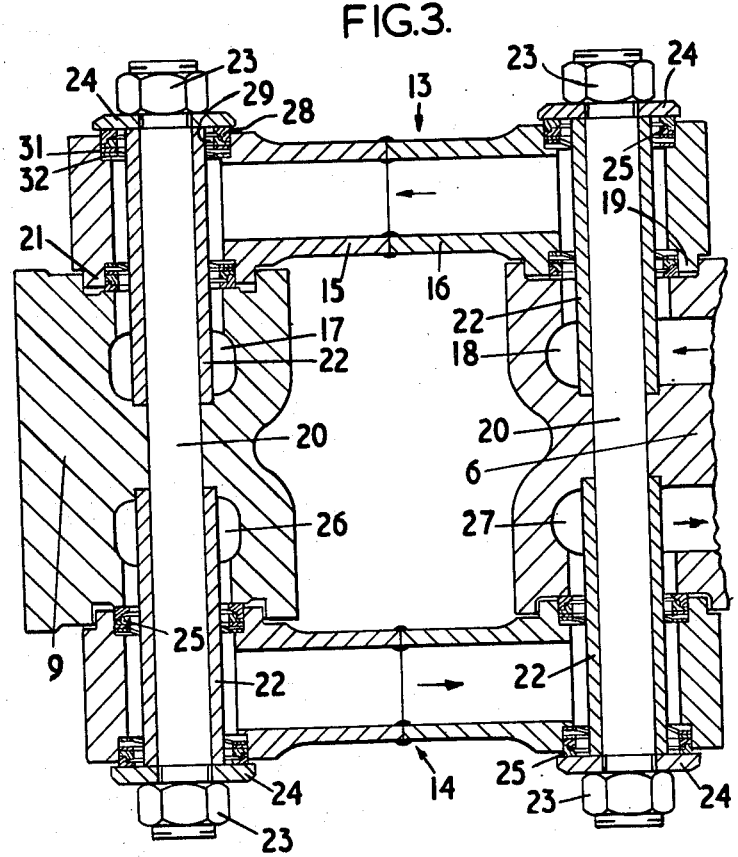

3,143,859
HYDRAULIC APPARATUS
Oswald Thoma, Charlton Kings, Cheltenham, England, assignor to Dowty Hydraulic Units Limited, Ashchurch, England, a British company, and Unipat A.G., Glarus, Switzerland, a Swiss company
Filed Mar. 7, 1963, Ser. No. 263,455
Claims priority, application Great Britain Mar. 7, 1962
5 Claims. (Cl. 60—53)

This invention relates to hydrostatic transmissions.

The present invention provides a hydrostatic transmission including a piston pump unit, a piston motor unit, a main link pivotally connected to each unit in such a manner as to control movement of one unit as a result of movement of the other unit, and at least one slave link pivotally connected to each unit in such a manner that substantially no force is transmitted from one unit to the other unit by the slave link, each slave link including a passage for transferring liquid from one unit to the other unit.

The main link may include a passage for transferring liquid from one unit to the other unit.

Each unit may be of the axial-piston tilting head type, the links being pivotally connected to the tilting heads of the units.

The pivotal connections of each slave link may include liquid seals which allow lost-motion between the units and the links. Each liquid seal may be a face seal.

Figure 1:
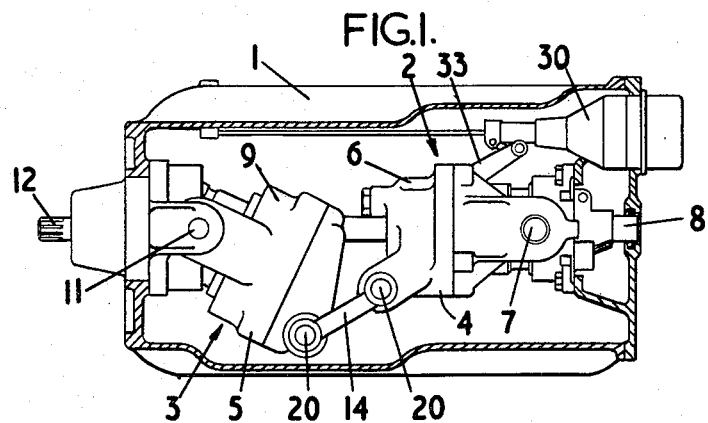
Figure 2:
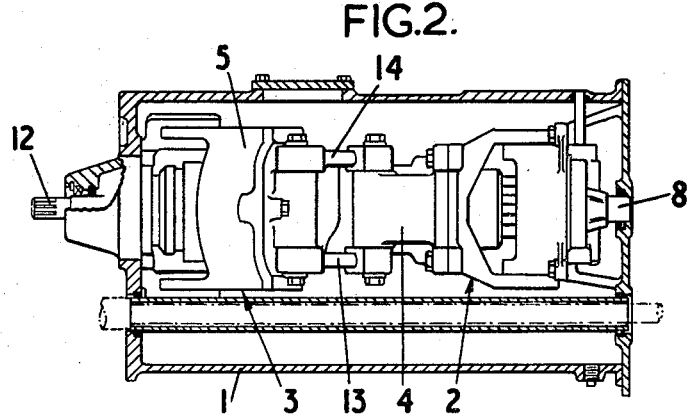

One embodiment of the present invention will now be described, by way of example, with reference to the accompanying drawings, of which, FIGURE 1 is a partly-sectional side view of a hydrostatic transmission, FIGURE 2 is a similar underneath view of the hydrostatic transmission, and FIGURE 3 is a sectional view of part of the hydrostatic transmission showing the linkage connected to the pump and the motor.

With reference to the accompanying drawings, a hydrostatic transmission includes a housing 1 in which is mounted a hydraulic pump unit 2 and a hydraulic motor unit 3. Both the pump 2 and the motor 3 are of the axial-piston tilting head type and are located in the housing 1 with the tilting head 4 of the pump 2 adjacent the tilting head 5 of the motor 3.

A hydrostatic transmission including a tilting head pump and a tilting head motor is described in U.S. patent application Serial No. 230,893, filed October 16, 1962.

The head 4 of the pump 2 includes a yoke 6 pivotally mounted for movement about an axis 7, a rotatably mounted cylinder block with a series of cylinders in which are located a series of pistons, and a valve plate for controlling the flow of fluid into and out of the cylindrical bores. The pistons are connected by connecting rods to a rotatably mounted thrust plate which is driven by a drive shaft 8.

The head 5 of the motor 3 includes a yoke 9 pivotally mounted for movement about an axis 11 which is parallel and fixed relative to the axis 7, a rotatably mounted cylinder block with a series of cylinders in which are located a series of pistons and a valve plate for controlling the flow of fluid into and out of the cylindrical bores. The pistons are connected by connecting rods to a rotatably mounted thrust plate which drives a drive shaft 12.

Two links 13, 14 are each pivotally connected to the yoke 6 of the pump 2 and to the yoke 9 of the motor 3 and this linkage is best shown in FIGURE 3.

The link 13 is a main link which transmits force from one head to the other and controls movement of the heads 4 or 5 as a result of movement of the head 5 or 4 and ensures that the heads move together. The link 13 is formed from two similar parts 15, 16 which are butt-welded together to provide a passage for the transfer of liquid from the yoke 6 of the pump 2 to the yoke 6 of the motor 3. The yoke 6 has a passage 18 along which liquid flows from the valve plate of the pump 2 to the link 13 and the yoke 9 has a passage 17 along which liquid flows from the link 13 to the valve plate of the motor 3.

The link 13 has at one end a cylindrical spigot 19 which is a sliding fit in a cylindrical recess in the yoke 6 and has at the other end a cylindrical spigot 21 which is a sliding fit in a cylindrical recess in the yoke 9. A cylindrical member 22 projects from the yoke 6 through an aperture passing transversely through the spigot 19 and the remainder of the link 13, and a nut 23 and washer 24 secured on the end of the spindle 20 which passes through the member 22 retains the link 13 in assembly with the yoke 6, the link 13 being pivotable relative to the yoke 6 about the longitudinal axis of the member 22. The link 13 is secured in a similar manner to the yoke 9.

Two sealing assemblies 25 prevent leakage of liquid from one end of the link 13 between the link 13 and the yoke 6, and the link 13 and the washer 24 respectively, and will be described in more detail later. Two further sealing assemblies 25 prevent leakage of liquid from the other end of the link 13.

Since the spigots 19 and 21 are sliding fits in the recesses in the yokes 6 and 9 respectively, there is no play between the link 13 and the yoke 6 or the yoke 9 radially of the axis of the respective pivotal connection between the link 13 and the yoke 6 or the yoke 9 and hence the link 13 ensures that the heads 4 and 5 of the pump 2 and motor 3 respectively pivot together about their respective axes 7 and 11. In other words, the link 13 transmits force from one head to the other head which occurs in a direction parallel to the longitudinal axis of the link 13. However, it will be seen from FIGURE 3, that play is permissible between the link 13 and the yokes 6 and 9 in a direction parallel to the respective axes of the pivotal connections, and the pivotal connections can accommodate any small twisting of the links 13 and 14 which results if the axes 7 and 11 are not accurately parallel.

The link 14 is a slave link which does not transmit force between the heads of the pump 2 and motor 3 but serves to transfer fluid from a passage 26 in the yoke 9 of the motor 3 to a passage 27 in the yoke 6 of the pump 2. The passage 26 transfers liquid from the valve plate of the motor 3 to the link 14 and the passage 27 transfers liquid from the link 14 to the valve plate of the pump 2. The link 14 is pivotally connected to the yoke 9 and to the yoke 6 in a similar manner to the connections of the link 13 to the yoke 9 and to the yoke 6 with the exception that the spigots 19a and 21a of the link 14 are not sliding fits in recesses in the yoke 9 and the yoke 6 but have sufficient clearance to ensure that in use of the transmission the walls of the spigots 19a and 21a do not contact the walls of the recesses so that no force can be transmitted from the yoke 9 to the yoke 6 or vice versa by the link 14. The link 14 is merely a slave link which moves with the yokes 9 and 6 whose movement is co-ordinated by the link 13. The angular position of the heads of the pump 2 and motor 3 is adjusted by a control 30 which acts on the yoke 6 of the pump 2 by means of a lever 33.

The transmission includes two spindles 20, one of which projects from opposite sides of the yoke 6 and the other of which projects from opposite sides of the yoke 9. Each spindle 20 is associated with the link 13 and the link 14.

The hydrostatic transmission has eight sealing assemblies 25, four being associated with the master link 13 and four being associated with the slave link 14. Each sealing assembly 25 surrounds the respective member 22 and is located in a cylindrical recess in the respective link bearing against the wall of the recess and the respective washer 24. Each sealing assembly 25 includes a metal ring 28, which acts as a face seal, having a right-angled section with an outer cylindrical face bearing against the wall of the recess in the link and a flat side face perpendicular to the outer face and bearing against the washer 24 or yoke 6 or yoke 9. The sealing assembly 25 also includes a nylon ring 29 having a right-angled section, one arm of the section being a sliding fit within the metal ring 28 and the end of the other arm of the section engaging the wall of the recess in the link. The sealing assembly 25 also includes two backing rings 31, 32.

The pressure of the liquid in the link forces the sealing assembly 25 against the washer 24 and the wall of the recess in the link. Leakage of liquid between the sealing assembly 25 and the washer 24 is prevented by the metal ring 28 and leakage between the sealing assembly 25 and the wall of the recess in the link is prevented by the metal ring 28 and nylon ring 29.

In this embodiment, there is provided more than one link between the units, but only one of them transmits the motion of one unit to the other unit. In consequence, the tendency of the units to jam during their movements due to misalignment or deflections in the units, supports or links, is reduced.

I claim as my invention:

1. A hydrostatic transmission including a piston pump unit, a piston motor unit, a main link pivotally connected to each unit in such a manner as to control movement of one unit as a result of movement of the other unit, and at least one slave link pivotally connected to each unit in such a manner that substantially no force is transmitted from one unit to the other unit by the slave link, each slave link including a passage for transferring liquid from one unit to the other unit.

2. A hydrostatic transmission according to claim 1 wherein the main link includes a passage for transferring liquid from one unit to the other unit.

3. A hydrostatic transmission according to claim 1 wherein each unit is of the axial-piston tilting head type, the links being pivotally connected to the tilting heads of the units.

4. A hydrostatic transmission according to claim 1 wherein the pivotal connections of each slave link include liquid seals which allow lost-motion between the units of the links.

5. Apparatus according to claim 4 wherein each liquid seal is a face seal.

References Cited in the file of this patent
UNITED STATES PATENTS

| | | |
|---|---|---|
| 2,872,876 | Thoma | Feb. 10, 1959 |
| 2,967,395 | Foerster | Jan. 10, 1961 |